United States Patent
Fridental

(10) Patent No.: US 9,407,807 B2
(45) Date of Patent: Aug. 2, 2016

(54) DISTRIBUTED AUTOMATIC IMAGE AND VIDEO PROCESSING

(71) Applicant: Ron Fridental, Shoham (IL)

(72) Inventor: Ron Fridental, Shoham (IL)

(73) Assignee: FRIMORY TECHNOLOGIES LTD, Shoham (IL)

( * ) Notice: Subject to any disclaimer, the term of this patent is extended or adjusted under 35 U.S.C. 154(b) by 0 days.

(21) Appl. No.: 14/229,866

(22) Filed: Mar. 29, 2014

(65) Prior Publication Data

US 2015/0281549 A1    Oct. 1, 2015

(51) Int. Cl.
| | | |
|---|---|---|
| H04N 5/232 | (2006.01) | |
| H04N 1/21 | (2006.01) | |
| H04N 5/247 | (2006.01) | |
| H04N 21/414 | (2011.01) | |
| H04N 21/4223 | (2011.01) | |
| H04N 21/4788 | (2011.01) | |
| H04N 21/63 | (2011.01) | |
| H04N 21/84 | (2011.01) | |

(52) U.S. Cl.
CPC ......... *H04N 5/23206* (2013.01); *H04N 1/2129* (2013.01); *H04N 5/247* (2013.01); *H04N 21/41407* (2013.01); *H04N 21/4223* (2013.01); *H04N 21/4788* (2013.01); *H04N 21/632* (2013.01); *H04N 21/84* (2013.01)

(58) Field of Classification Search
CPC ............. H04N 5/23206; H04N 1/2129; G08B 13/19645; G08B 13/19689
See application file for complete search history.

(56) References Cited

U.S. PATENT DOCUMENTS

| | | | |
|---|---|---|---|
| 8,970,654 B1 * | 3/2015 | Johnson ................. | H04N 7/181 348/14.07 |
| 2008/0100704 A1 * | 5/2008 | Venetianer et al. .......... | 348/143 |
| 2008/0297608 A1 * | 12/2008 | Border .............. | H04N 1/00204 348/207.11 |
| 2011/0109802 A1 * | 5/2011 | Lee ......................... | G01S 17/87 348/584 |
| 2011/0191787 A1 * | 8/2011 | Poleg ....................... | G06F 9/44 719/328 |
| 2012/0140083 A1 * | 6/2012 | Schultz et al. ............. | 348/207.1 |
| 2015/0172342 A1 * | 6/2015 | Yin ......................... | H04L 65/60 |

* cited by examiner

*Primary Examiner* — Mekonnen Dagnew

(57) ABSTRACT

A method and system for cooperative image acquisition and processing. A system comprising a group of network-connected cooperating cameras, where upon determining an imaging event a camera requests imaging from cooperating cameras. The best video describing the event is selected or generated from the acquired videos. The additional description of the video is created in the form of machine-readable metadata, and human-readable text description.

20 Claims, 3 Drawing Sheets

DISTRIBUTED AUTOMATIC IMAGE AND VIDEO PROCESSING

BACKGROUND

The invention is related to automated capturing and processing of digital photographs and videos. Acquiring digital photographs and videos continues to take an ever increasing role of our lives. Often in the sports, travel and other activities people use the hand free cameras, mounted on their body, helmet or equipment. These cameras can take the photographs or video in the automatic mode, taking video continuously of taking photographs continuously with given predefined time intervals. Unfortunately, this method suffers from several shortcomings: In the continuous shooting, large files are produced, which wastes a lot of storage and battery life for majority of useless and unnecessary photos and videos, and requires time-consuming search and processing in order to extract the interesting part of the video or relevant photos. Furthermore, limitation of storage and buttery life may require decrease of the resolution, frame-rate and increase of the intervals between the taken photos. For example, in the use of such camera for continuous capturing of the photos once in every several seconds, the memory card or battery can run-out even before arriving to the interesting moment, worth of capturing, or the interesting moment can still be missed in the middle between the two consecutive shootings.

Furthermore, the camera attachment to the user body often prevents capturing from desired perspective, when the user wants to see him on the photo.

SUMMARY

Advances in several areas of technology allow the new approach to capturing of video and still images:

Advances in digital imaging technology, improvements of the optics, increase of the resolution and image quality and decrease of the camera price made the game-changing situation, when the user is often surrounded by multiple other users and cameras, capable to take a high resolution images or videos of him from several respective perspectives;

Advances in web connectivity, increase of bandwidth, and areas of coverage with simultaneous decrease of power consumption and price of the connection, allow network connection of the digital cameras, exchange of necessary system information as well as fast uploading and downloading of large photo and video files.

Advances in image and video processing and video understanding, face and object recognition allow recognition of the person, and the environment from different perspectives, as well as automatic recognition of scene or situation of interest in the video flow.

Advances in the 3D scanning, stereo processing of the images or video taken from different perspectives and computer graphics generation allow rendering of the image or video from the new desired perspective;

Image processing and understanding of the acquired video, as well as body parameter monitoring, and GPS and accelerometer sensors allow determining the important and exciting moments of the user experience and selectively capturing them, by turning on the video, camera shooting, or increasing the resolution, quality and frame rate.

GPS and other navigation systems, as well as other techniques allow mapping and registering the camera location, and allow knowing the list of connected cameras relevant for current event.

Rise of popularity and use of social networks, and social programs with tracking of the user locations, user recognition and tagging, as well as other means of tracking of user physical location and identification of user in photos and videos allow tracking and registering the user, in the photos and videos captured by his friends, and other cooperating users with cameras in the relevant location at a relevant time interval.

Combined use and modification of some of the above solutions, organized in the proper system as described in this disclosure allows a new approach to digital imaging and video acquisition. Namely, the approach where the wearable cameras are in continuous 'ready' state, and continuously capture video, audio and other information from all the relevant sensors in the energy-saving 'economy' mode, with the results continuously processed to recognize the 'important' situation. The most important and interesting events are automatically or semi-automatically detected and chosen or generated based on the information acquired by the one or more cameras that were operating at appropriate location and appropriate time. The cameras may be connected to the network and cooperating at the time of the event, or the video and photos acquired by cameras may be uploaded to the network and processed later.

Consider the following example scenario: A user is skiing on the ski resort. He is performing a ski stunt. The moments of the stunt beginning and end are automatically detected, the user camera starts to acquire the video and images and appropriate high-quality settings. The other cooperating cameras present in the vicinity also start video and image capturing during the relevant interval. After the event, the video acquired from all the cameras is automatically processed, the best video from the best angle is chosen, or generated on the basis of several cameras. Video is stabilized, and enhanced on the basis of information from multiple cameras, and possibly from other images and videos of the recognized people, and objects.

The appropriate moment of the stunt is found from one or more of the following clues: Processing of the video acquired by a camera mounted on his body or equipment, processing of the sound, position, speed, acceleration or other sensor information from the sensors on the camera or other devices. This may also include the body monitoring sensors, such as heart and brain activity.

Other registered and cooperating cameras that are relevant are determined, based on their location and the field of view. The accelerated frame rate, improved quality and shooting of higher resolution of still images may be applied by the relevant cooperating cameras at the time of the event.

The best photo, video from the best direction is chosen, or generated based on several videos/photos from similar directions. They can also be found later offline, based on the search among all the relevant cameras, and their databases of images/videos taken at the time and location of the event.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. In the drawings, like reference numerals designate corresponding parts throughout the several views.

DETAILED DESCRIPTION

Figure 1:
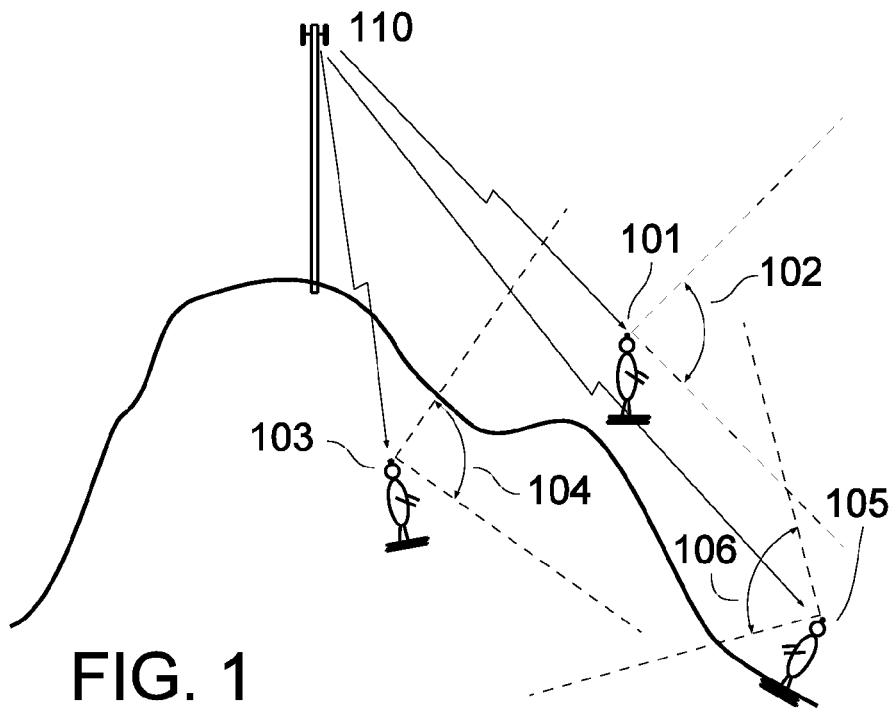
FIG. 1 is a schematic drawing of the system of networked and cooperating cameras according to one embodiment of present invention.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be executed on a general purpose processor, application processor, application specific integrated circuit, such that the executed instructions, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The components in the drawings are not necessarily to scale, emphasis instead being placed upon clearly illustrating the principles of the present disclosure. In the drawings, like reference numerals designate corresponding parts throughout the several views.

One of the objects of the present invention is to provide a method and a system for automatic and semiautomatic acquiring of the video and still images in the environments of two and more cooperating imaging systems, further referred as imagers.

Each imager comprises a digital imaging camera, capable to acquire digital still images and/or videos and/or 3D videos. It may further comprise a connection to the network, providing communication between the imagers, or a means providing direct communication with other cooperating imagers. Imagers may have additional sensors such as GPS and other navigation and positional sensors, accelerometers; audio, biological and bio sensing sensors. Imagers may further comprise the image processing hardware and or software, and may be capable to upload captured images and video to the network for processing.

In this disclosure by the term 'camera', we denote the digital imaging camera capable to capture still images and/or video. Furthermore, in some cases the 'imager' described above will be referred to as 'camera'. Throughout this disclosure the terms 'image' or 'video' will be used instead of 'still images or video'. By term 'automatic acquisition' we denote the acquisition either with or without direct initiating by user, with or without configuring, starting, stopping and selection by user. These variants and their combinations are not listed in the text for the sake of clarity and compactness of presentation.

One of the intended application of imagers is to be attached to the body or equipment of users, performing active sports or other activity which they want to be captured. An example of such activity may be skiing or snowboarding at the ski resort, surfing or kite-surfing in the sea, biking, hiking etc. Although the user wears the imager for prolonged time, he may be particularly interested only in imaging of specific events.

By term 'imaging event' or 'event', we denote the particular interesting events, which are estimated to be valuable to the user, and which deserve enhanced imaging. Such events may be determined automatically on the base of processing of continuously acquired video and/or sensor data. An imaging event can be detected by change of scene, speed, user activity, detection of relevant people or objects in the scene, detection accelerated heart-rate, speed, height, pressure, accelerations, sounds or other information. We assume that there are at least two modes of operation of the imager: the normal mode, in which may monitor the sensor data and acquire video, possibly at reduced resolution and frame rate, and enhanced imagine mode, when the imaging is performed at accelerated frame rate, enhanced resolution, 3D acquisition, etc.

One of the objectives of the present invention is to provide a method and a system for automatic video acquisition by the system of cooperating imagers. When one of the imagers detects an imaging event, it switched the imaging into enhanced mode, and informs the cooperating imagers in its vicinity. These cooperating imagers start imaging of the same event, in order to provide the video of the event from different and possibly more favorable perspectives and positions, for further processing or selecting of the best video of the event.

Yet another objective of the present invention is to provide a method and a system for video processing. An imaging event is captured by several imagers from different positions and perspectives, and the acquired video is uploaded to the network for further processing. In the processing stage, the best video is selected or generated on the basis of several acquired videos. The best video is determined on the basis of image quality and event description quality.

The image quality criteria may include the noise level, proper values of focus, exposure, white balance, video stabilization etc. Event description quality include the scale, distance, perspective angle, scene quality (the main subjects or objects obscured or clearly seen), scenery etc. The event can be located by image processing, face detection and recognition, scene analysis, processing of sensor data, such as position sensors, pressure, speed, biosensors etc.

In the generation of the output video, the image quality may be improved via processing the data of multiple acquired videos, and/or via adding the images of recognized people and objects, stored elsewhere. Furthermore, additional layer of information such as user speed, position, acceleration etc. may be imposed over the video.

In the generation of the output video from several sources, the digital right management (DRM) may be taken into account, where among the source videos only the videos with appropriate DRM label are selected, and the produced video is labeled and possibly watermarked accordingly. The appropriate DRM labelling may be applied to the whole video, as well as to individual intervals and/or frames. DRM information may be also provided by DRM server.

Yet another objective of the present invention is to provide video by text description, referred here as 'story board', and to automatically provide the text description (story board) of the video.

The story board from the user request may look as following: "video about my biking in early march under the rain". The parser recognizes that this is the video regarding the biking activity, the date and weather conditions, extracts the relevant videos, the search may be facilitated by recording the sensor data together with the video, such as location, weather conditions etc. When the activity location is determined from user history, all the videos recorded at the relevant place and time are processed, the videos containing the user are determined, and the best and most relevant videos are extracted by the scene and video analysis. Another useful clue is the user comments under the video in the social networks. Analysis of this comments allows to create a video-related metadata, describing the activity, participants, and creating the links to related events and posts.

Yet another objective of the present invention is to provide automatic text description for the acquired video. Scene analysis and scene recognition may allow to determine activity. Sensor data analysis, such as location, speed, biosensors may further add to the description. Video related metadata, as well as user comments under the video in the social network, tagging of participants, links to the relative places, users an events will further help creating the video description.

FIG. 1. Schematically shows one embodiment of the present invention. 101, 105 and 106 schematically show the users with mounted cameras according to one of the embodiments. 102, 106 and 104 are respective fields of view of these cameras. User 101 performs some stunt, which importance is detected via the image processing of the video of his camera and or processing of information from its other sensors, such as GPS data, including the speed, accelerometers, body monitoring sensors such as heart rate, brain activity etc. After the interesting or important situation is identified, the camera sends a cooperation request via the network, which is illustrated by antenna 110. The nearby and relevant cameras 103 and 105 are identified and activated, acquiring the video or photos of the same event and allowing image acquisition from additional and possibly better directions.

Figure 2:
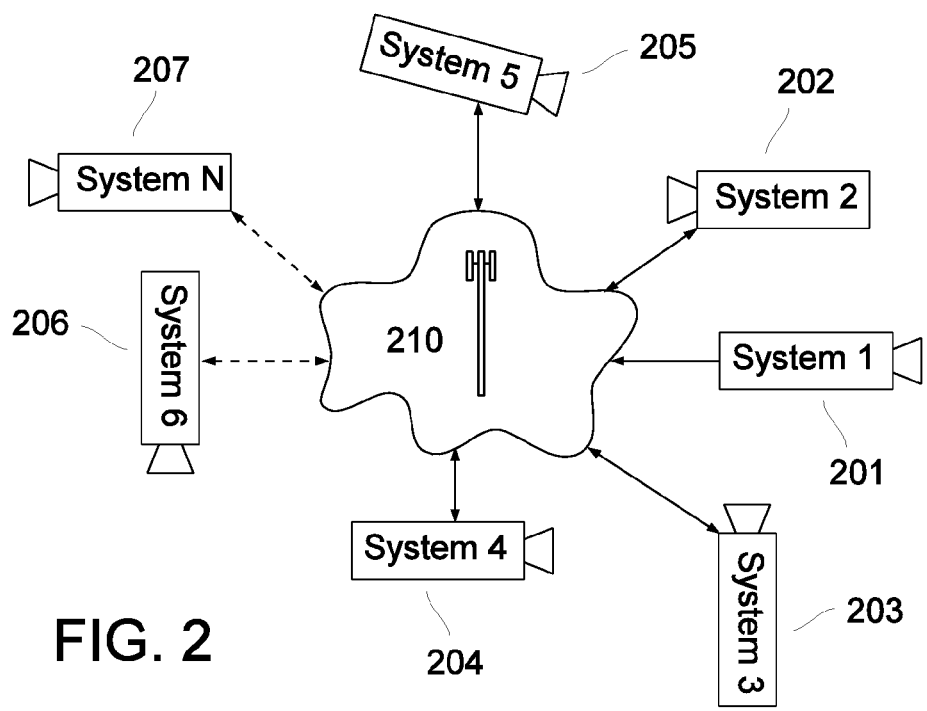
FIG. 2 is an illustration of connectivity and engagement of the cooperating cameras according to one embodiment of present invention.

FIG. 2. Schematically shows one embodiment of the present invention. 201-207 schematically shows different cameras according to one of the embodiments. Camera 201 ('system 1') identifies that its user performs some stunt, which importance is detected via the image processing of the video of his camera and or processing of information from its other sensors, such as GPS data, including the speed, accelerometers, body monitoring sensors such as heart rate, brain activity etc. After the interesting or important situation is identified, the camera sends a cooperation request via the network 210. Among the nearby cameras 202-207, the relevant cameras 202-205 are identified and activated, they start imaging and sent to the network the initial images or videos, as well as data from their sensors. After processing of the data, only the relevant cameras (203-205) are requested to continue acquisition acquiring the video or photos of the same event. Finally, after the event finish is determined by camera 201, it sends corresponding notification to the network, and the network notifies the nearby cameras.

Figure 3:
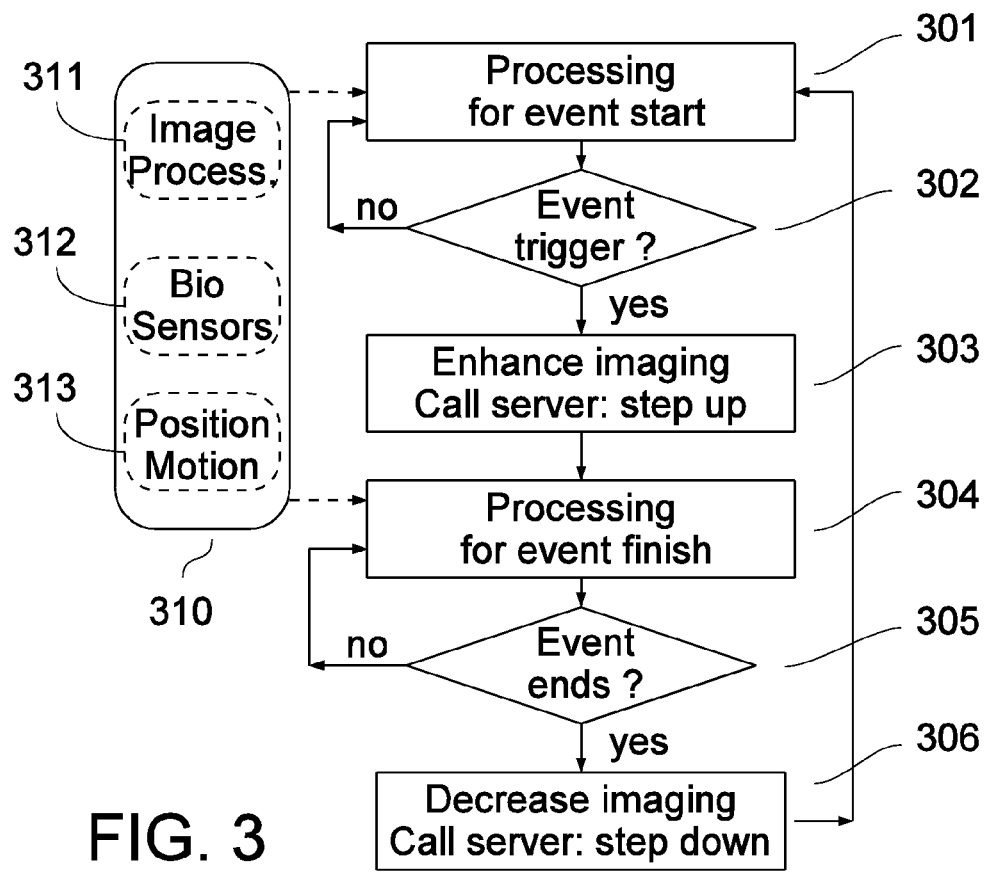
FIG. 3 is a schematic flow chart of camera operation and network communication according to one embodiment of present invention.

FIG. 3 is a schematic flow chart of camera operation and network communication according to one embodiment of present invention. Block 301 shows how a camera looks for an event start, by processing the data from the camera (311), navigation system and accelerometers (313), and biosensors (312). Namely, image analysis and understanding of the video input from the camera, allows to recognize an interesting event—when the view is informative, rapidly changing, when the scene is moving fast, or has other unusual parameters, many faces or faces of important friends, beautiful scenery, or statistics is similar to the images and videos that user loves to image etc. Navigation system shows location near the interesting objects, mountain peaks, etc. Speed or acceleration are unusually high, or acceleration is low (jump or free-fall); biosensors show accelerated heart-rate, or brain activity etc.

When the start of the event is recognized in 301-302, two actions are performed by the camera in block 303: the imaging is enhances—by possible increase of the resolution, frame-rate or other image or video quality parameters, and the network server is informed about the event start, and requested to find the cooperating cameras in the vicinity. All the cameras are filtered by location, and possibly other criteria, the relevant cameras are requested for cooperation, they can 'agree' or refuse. In the case they 'agree' to cooperate, they may reply back the data about their position, field of view, battery state and possibly other parameters. On the basis of replies from available cameras, the server chooses the most appropriate cameras, and discards the less appropriate. It may send the confirmation signal to one or both of the said groups of cameras.

The initiating camera continues to process the acquired video and sensor data in steps 304-305, until the end of the event is recognized, when it informs the server in step 306. At this moment the helping cameras are disengaged. Some of them could be disengaged earlier, due to relative motion of the user and the helping camera. Others may become engaged for the same reason.

Figure 4:
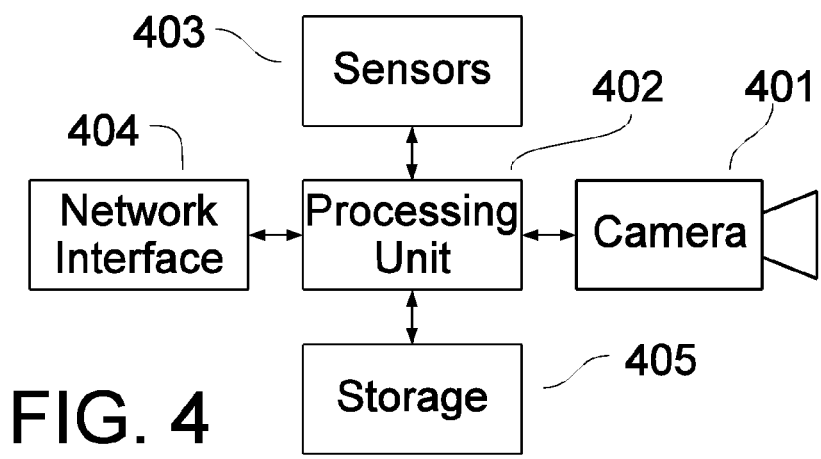
FIG. 4 is a schematic block diagram of the camera system according to one of the embodiments of the present invention.

FIG. 4 is a schematic block diagram of the camera system according to one of the embodiments of the present invention. It consists of the digital imaging camera 401, comprising the optical lens, the image sensor and the image signal pipeline (ISP); the facilitates acquisition of video and still images; the sensors 403, comprising navigation signals, accelerometers, body sensors, pressure, magnetic field and other sensors; the sensors facilitate acquisition of all the sensor information, necessary for image processing, identification of situations important to the user, and identification of the cameras that can be helpful in cooperative acquisition; the network interface 404, facilitating all the communication with the network, including the sending and receiving of requests, sending and receiving the metadata, control data, sensor data and image and video, and other necessary or relevant information. The storage 405 facilitates storage and reading of video and other data; the processing unit 402 facilitates coordination and control of the system and its components.

Figure 5:
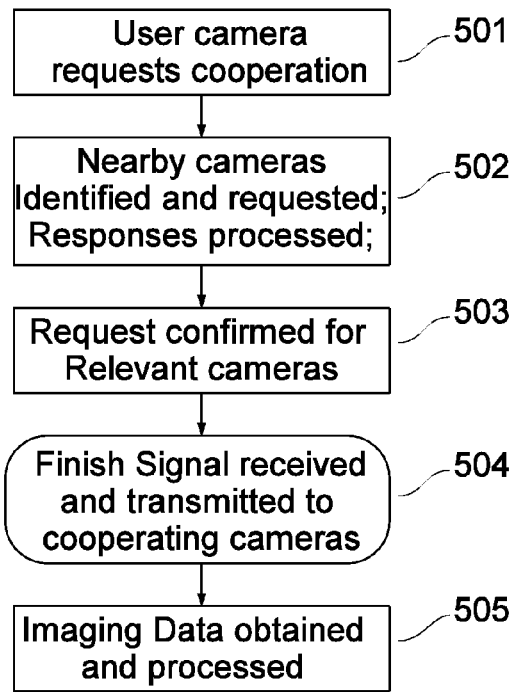
FIG. 5 is a flow chart of the camera operation and cooperation with the nearby cameras.

FIG. 5 is a flow chart of the camera operation and cooperation with the nearby cameras. After the user camera recognizes a start of an important event, it requests cooperation from the nearby cameras via the network or by direct communication in block 501. The nearby cameras are identified and request is sent to them in block 502. Upon the replies from the cameras, the relevant cameras are requested to start videoing in block 503. The irrelevant cameras among the nearby might be the cameras with improper orientation, or exact positioning, or exhausted battery, etc. After the end of the event, the 'finish' signal is sent to the cooperating cameras in block 504. Finally, the data is obtained from the cameras and processed in block 505.

Figure 6:
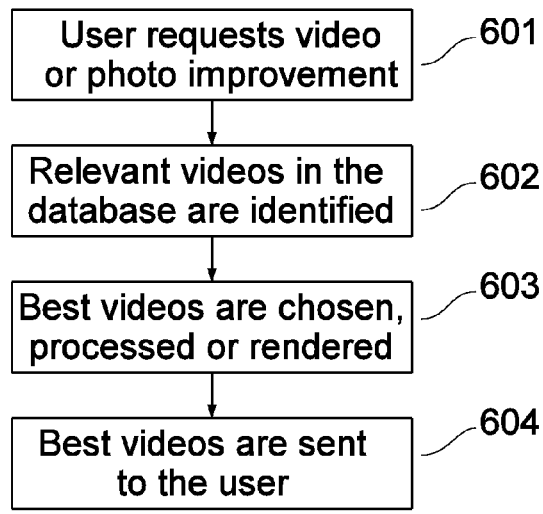
FIG. 6 is a flow chart of the processing of user request for video or photo improvement.

FIG. 6 is a flow chart of the processing of user request for video or photo improvement. After the user requests a specific photo or video in block 601, all the database of participating users is searched in block 602; relevant photos and videos are identified based on date, time, location as well as other data and image quality in block 603; finally the best videos are processed to render the sequence of best quality from shoot or generated from the best direction and the result is sent to the user in block 604.

What is claimed is:

1. A method for cooperative imaging of events, said method comprising:
   monitoring, by image processing circuitry, image data collected by a first mobile imaging device;
   automatically identifying, by the image processing circuitry, based on a computerized analysis of content of the image data, an interesting event currently occurring;
   upon identifying the interesting event, automatically triggering activation of imaging functions of other mobile imaging devices in position to image the interesting event by: (i) identifying one or more other mobile imaging devices in position to image the event; and (ii) sending a signal to the identified one or more other mobile devices, which signal causes the one or more other mobile imaging devices to image the interesting event.

2. A method according to claim 1, further comprising, upon identifying the interesting event, automatically enhancing a quality of imaging of the first mobile imaging device.

3. A method according to claim 1, wherein automatically enhancing a quality of imaging of the first mobile imaging device includes increasing a resolution or frame rate of an imager of the first mobile imaging device.

4. A method according to claim 1, wherein the first mobile imaging device and the one or more other mobile imaging devices interact via a server using a communication network.

5. A method according to claim 1, wherein the first mobile imaging device and the one or more other mobile imaging devices directly communicate with each other.

6. A method according to claim 1, further comprising receiving image data of the interesting event from two or more imaging devices of the first mobile imaging device and the one or more other mobile imaging devices and creating a video of the event including image data from multiple imaging devices by processing the received image data.

7. A method according to claim 6, wherein said creating a video of the event includes factoring sensor data, other than image sensor data, detected by physical sensors of the multiple imaging devices.

8. A method according to claim 6, further comprising adding a layer to the created video displaying a user speed.

9. A method according to of claim 1, wherein the first imaging device is attached to a human user, and said identifying an interesting event includes identifying a parameter of a movement, of the human user, indicating the interesting event.

10. A method according to claim 1, wherein said identifying an interesting event includes comparing parameters of the monitored image data to reference parameters indicating interesting events.

11. A method for cooperative imaging of events, said method comprising:
    monitoring, by image processing circuitry, parameters of movement of a first mobile imaging device detected by movement sensors functionally associated with the first mobile imaging device;
    automatically identifying, by the image processing circuitry, based on a computerized analysis of parameters of one or more movements of the first mobile imaging device detected by the movement sensors, an interesting event relating to a carrier of the first mobile imaging device;
    upon identifying the interesting event, automatically triggering activation of imaging functions of other mobile imaging devices in position to image the interesting event by: (i) identifying one or more other mobile imaging devices in position to image the event; and (ii) sending a signal to the identified one or more other mobile devices, which signal causes the one or more other mobile imaging devices to image the interesting event.

12. A method according to claim 11, further comprising, upon identifying the interesting event, automatically enhancing a quality of imaging of the first mobile imaging device.

13. A method according to claim 12, wherein automatically enhancing a quality of imaging of the first mobile imaging device includes increasing a resolution or frame rate of an imager of the first mobile imaging device.

14. A method according to claim 11, further comprising receiving image data of the interesting event from two or more imaging devices of the first mobile imaging device and the one or more other mobile imaging devices and creating a video of the event including image data from multiple imaging devices by processing the received image data.

15. A method according to claim 14, further comprising adding a layer to the created video displaying a user speed.

16. A method according to claim 11, wherein said identifying an interesting event is based on sudden changes of parameters of movement of a first mobile imaging device detected by the movement sensors.

17. A method for cooperative imaging of events, said method comprising:
    monitoring, by image processing circuitry, parameters detected by biological sensors functionally associated with a first mobile imaging device;
    automatically identifying, by the image processing circuitry, an interesting event relating to a user of the first mobile imaging device, based on a computerized analysis of changes of one or more biological parameters of a user of the first mobile imaging device, detected by the biological sensors;
    upon identifying the interesting event, automatically triggering activation of imaging functions of other mobile imaging devices in position to image the interesting event by: (i) identifying one or more other mobile imaging devices in position to image the event; and (ii) sending a signal to the identified one or more other mobile devices, which signal causes the one or more other mobile imaging devices to image the interesting event.

18. A method according to claim 17, further comprising, upon identifying the interesting event, automatically enhancing a quality of imaging of the first mobile imaging device.

19. A method according to claim 17, further comprising receiving image data of the interesting event from two or more imaging devices of the first mobile imaging device and the one or more other mobile imaging devices and creating a video of the event including image data from multiple imaging devices by processing the received image data.

20. A method according to claim 17, wherein the one or more biological parameters include a heart rate or breathing pattern.

* * * * *